(12) United States Patent
Li et al.

(10) Patent No.: US 12,181,624 B2
(45) Date of Patent: Dec. 31, 2024

(54) TRACING METHOD AND APPARATUS BASED ON ELECTROMAGNETIC FIELD

(71) Applicant: SHANDONG UNIVERSITY, Shandong (CN)

(72) Inventors: Shucai Li, Jinan (CN); Huaifeng Sun, Jinan (CN); Nuoya Zhang, Jinan (CN); Yang Yang, Jinan (CN); Shangbin Liu, Jinan (CN); Wenhan Li, Jinan (CN); Rui Liu, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 544 days.

(21) Appl. No.: 17/618,410

(22) PCT Filed: Jul. 13, 2020

(86) PCT No.: PCT/CN2020/101697
§ 371 (c)(1),
(2) Date: Dec. 10, 2021

(87) PCT Pub. No.: WO2022/000566
PCT Pub. Date: Jan. 6, 2022

(65) Prior Publication Data
US 2022/0413177 A1  Dec. 29, 2022

(30) Foreign Application Priority Data
Jun. 29, 2020 (CN) .......................... 202010603038.3

(51) Int. Cl.
*G01V 3/02* (2006.01)
(52) U.S. Cl.
CPC ...................... *G01V 3/02* (2013.01)
(58) Field of Classification Search
CPC ............. G01V 3/06; G01V 3/02; Y02A 90/30
See application file for complete search history.

(56) References Cited

U.S. PATENT DOCUMENTS 6,593,746 B2 * 7/2003 Stolarczyk ............... G01V 3/12
324/334
8,289,201 B2 * 10/2012 Holly ..................... F41H 11/136
342/134
(Continued)

FOREIGN PATENT DOCUMENTS

CN       101285895 A      10/2008
CN       102096112 A       6/2011
(Continued)

OTHER PUBLICATIONS

Liangang, Shu et al., "The Application of Pseudorandom Flow-Field Method to Detecting a Dam Foundation Leakage", Chinese Journal of Engineering Geophysics, vol. 9, No. 3, May 2012, pp. 332-336.
(Continued)

*Primary Examiner* — An H Do
(74) *Attorney, Agent, or Firm* — Oliff PLC

(57) ABSTRACT

A novel tracing apparatus includes an electromagnetic transmitting system, a multi-frequency transmitting antenna, electrodes, and a receiver. The electromagnetic transmitting system is at an upstream point and includes a generator and a transmitter having a capacitor; the transmitting antenna penetrates into a detected aquifer through karst collapse or a drill hole; the electrodes and the receiver are at a downstream point, and include two pairs of electrodes orthogonally distributed and located in a cofferdam formed by downstream water; and the receivers collect electric signals in the electrodes. The apparatus is based on good electrical conductivity of water, and can use electromagnetic signals as a tracer for rapid observation. Compared with traditional tracers, electromagnetic signals propagate fast in water, are stable in property, and free of pollution. This apparatus can be applied to groundwater tracing detection, and problems
(Continued)

with the traditional tracers having poor timeliness and being environmentally unfriendly are resolved.

6 Claims, 1 Drawing Sheet

(56) References Cited

U.S. PATENT DOCUMENTS

| | | | |
|---|---|---|---|
| 8,884,805 B2 * | 11/2014 | Tomich | G01S 13/885 342/22 |
| 2003/0048105 A1 | 3/2003 | Ellingsrud et al. | |
| 2003/0062902 A1 | 4/2003 | Stolarczyk | |
| 2012/0229321 A1 | 9/2012 | Holly et al. | |

FOREIGN PATENT DOCUMENTS

| | | |
|---|---|---|
| CN | 104391333 A | 3/2015 |
| CN | 104471443 A | 3/2015 |
| CN | 204613417 U | 9/2015 |
| CN | 105259584 A | 1/2016 |
| CN | 106547030 A | 3/2017 |
| CN | 106908847 A | 6/2017 |
| CN | 106950602 A | 7/2017 |
| CN | 108227022 A | 6/2018 |
| CN | 108776355 A | 11/2018 |
| CN | 208984811 U | 6/2019 |
| CN | 111007578 A | 4/2020 |
| CN | 111175832 A | 5/2020 |
| EP | 0 067 514 A1 | 12/1982 |

OTHER PUBLICATIONS

Lin, Chunjin et al., "Comprehensive Geophysical Investigation and Analysis of Lining Leakage for Water-Rich Rock Tunnels: A Case Study of Kaiyuan Tunnel, Jinan, China", Geotech Geol Eng, Feb. 18, 2020, pp. 3449-3468.
Mar. 23, 2021 Office Action issued in Chinese Patent Application No. 202010603038.3.
Mar. 25, 2021 Search Report issued in Intrnational Patent Application No. PCT/CN2020/101697.
Mar. 25, 2021 Written Opinion issued in Intrnational Patent Application No. PCT/CN2020/101697.

* cited by examiner

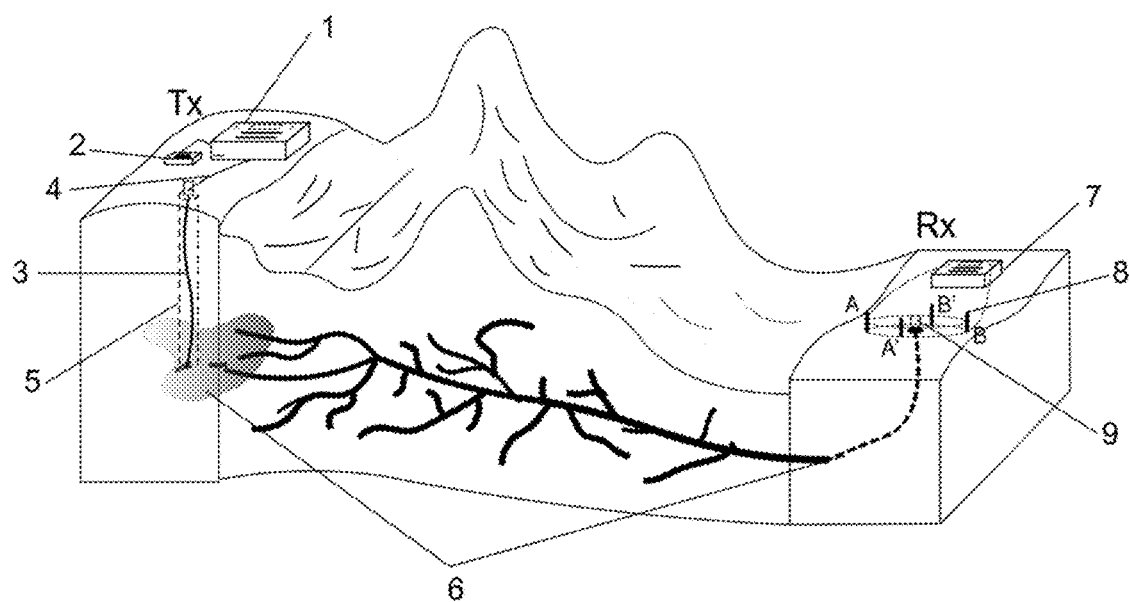

TRACING METHOD AND APPARATUS BASED ON ELECTROMAGNETIC FIELD

TECHNICAL FIELD

The present invention relates to the field of connectivity detection of a groundwater system in hydrogeological surveys, or the field of leakage or piping detection of dams and the like, or the field of detection of karst channels under complex geological conditions in underground construction. In particular, the present invention relates to a novel tracing method and apparatus based on an electromagnetic field.

BACKGROUND

Groundwater tracing is an important on-site detection method for studying the movement of groundwater. This method can be divided into two types: natural tracing and artificial tracing. Artificial tracing, which is widely applied, usually adopts radioisotope tracing logging and groundwater connectivity tracing methods to study a groundwater system.

At present, the main method for determining hydraulic connection of the groundwater system is groundwater connectivity tracing including putting an object source capable of moving along with water, receiving and detecting the object source at a location where the object source is expected to arrive, and comprehensively analyzing characteristics of a dielectric field and a potential field according to a detection result, so as to obtain hydrodynamic properties of a natural flow field of the system. Groundwater connectivity tracing has a clear conclusion, which can intuitively reflect a movement state of the groundwater system, and therefore can be widely applied to researches on groundwater boundaries and runoff paths in the fields of regional hydrogeological surveys, environmental monitoring, engineering construction, and the like.

According to the types of tracers, groundwater connectivity tracing can be divided into the following types:
  (1) Simple groundwater connectivity detection, which adopts groundwater as the tracer;
  (2) Physical connectivity tracing detection, which includes underwater acoustic tracing, hydrogeological bomb tracing, and the like;
  (3) Particle connectivity tracing detection, which adopts water-insoluble particles as the tracer;
  (4) Artificial radioisotope connectivity tracing detection; and
  (5) Chemical reagent connectivity tracing detection, which mostly adopts a salt ionic compound, a common pigment, a fluorescent pigment, or an ion-molecule tracer as the tracer.

At present, a chemical reagent or an artificial radioisotope is mainly adopted for groundwater connectivity tracing. First, a tracer that greatly differs from the background values of chemical components of groundwater and has relatively good stability and high solubility is selected and injected into an aquifer related to a water leakage point through a drill hole in the ground, and then water injection and pressurization are performed, so as to enable the tracer to continuously migrate and diffuse as the groundwater flows. After that, sampling is regularly performed at a lower end discharge point of the groundwater flow for monitoring, a change rule of the concentration of the tracer over time is analyzed, so as to analyze a movement rule of the groundwater of a water-bearing channel, and then various types of related information of the groundwater movement between a feeding point and a receiving point is indirectly obtained. The concentration of the tracer is gradually reduced and diffused along the movement direction of the groundwater flow, the relationship between a peak concentration and a distance is obtained, the flowing speed of the tracer along a specific direction can be obtained, and then a size and development of the underground water-bearing channel can be deduced.

However, traditional tracing detection has the following disadvantages:

(1) Tracer-Dependence, Causing Pollution or Harmfulness

At present, commonly used tracers include isotopes, common pigments, fluoresceins, radioactive indicators, and the like, and components of such substances easily cause damage to groundwater, soil, and plants, pollute the environment, and do not meet environmental requirements. In addition, the tracers have poor stability, detection results are greatly affected by human factors, and the tracers cannot adapt to complex geological environments, and cannot meet the requirements of large-scale connectivity detection.

(2) Long Observation Time and Poor Timeliness

The tracers move so slowly in water, particularly in the large-size water-bearing channel, that observation results can be obtained one day or even several days after the tracers are put in the water, so that the size and development of the water-bearing channel cannot be learnt in time.

SUMMARY

Aiming at the disadvantages of traditional tracing detection, the present invention provides a novel tracing detection method and apparatus. Electromagnetic signals can be used as a tracer due to the physical characteristics of good electrical conductivity of water, an extremely high propagation speed of electromagnetic signals in water, and no harm to the environment. A transmitting apparatus is disposed at a drill hole to transmit designed multi-frequency electromagnetic fields to an underground aquifer, the electromagnetic signals are rapidly propagated in a water body, and an electromagnetic receiving apparatus is disposed at a water leakage point for observation. According to frequencies, amplitudes, and phases of the electromagnetic signals, electrical conductivity of water and an observation time length, connectivity between the underground aquifer and the water leakage point is determined, and a position and a size of an underground water-bearing channel are determined.

The present invention adopts the following technical solutions:

In the first aspect, the present invention provides a novel tracing method based on an electromagnetic field, including:
  (1) determining an upstream point and a downstream point that are to be detected, taking the upstream point as a transmitting end, and taking the downstream point as a receiving end;
  (2) disposing a transmitting antenna into water at the transmitting end of the upstream point, and disposing an electromagnetic transmitting system at the transmitting end, where the electromagnetic transmitting system can transmit electromagnetic signals to the water;
  (3) disposing two pairs of orthogonal non-polarized electrodes and a receiver at the downstream point, taking the downstream point as a center, and guiding the downstream water to form a small cofferdam, so that the non-polarized electrodes remain in the water;

(4) starting the receiver to collect electric signals in the non-polarized electrodes, and after a period of time, starting a transmitting system without shutting down the receiver;

(5) after the transmitting system is started, completing a plurality of times of transmitting according to designed waveforms, where a quantity of actual repeated observation times is determined according to selected frequencies and receiving and transmitting distances, so as to facilitate observation, and after the transmitting system works for a set period of time, closing the transmitting system; and (6) after the transmitting system is completely closed, enabling a collection system to still continuously work for a set period of time, and then stopping detection; determining whether a water leakage point is in connection with an aquifer at a drill hole according to whether the electromagnetic signals can be monitored, and deducing connectivity of the underground water-bearing channel according to frequencies, amplitudes, and phases of the electromagnetic signals, electrical conductivity of water, and an observation time length.

In the second aspect, the present invention further provides a tracing detection apparatus, including an electromagnetic transmitting system, a transmitting antenna, electrodes and a receiver.

The electromagnetic transmitting system is disposed at an upstream point and includes a transmitter and a generator, and the transmitter includes a capacitor. Switches are disposed on the capacitor to control charging and discharging processes of the capacitor, and a charging cable in connection with an industrial electricity source and a discharging cable connected to the transmitting antenna are disposed on a positive plate of the capacitor, where a charging switch controls connection of a circuit between the charging cable and the capacitor, and a discharging switch controls connection of a circuit between the discharging cable and the capacitor.

The transmitting antenna adopts a plurality of frequencies, a length and the frequencies of the transmitting antenna can be designed and selected according to actual detection requirements and detection parameters, and the transmitting antenna penetrates into a detected aquifer through karst collapse or a drill hole.

The electrodes and the receiver are disposed at a downstream point, the electrodes include two pairs of electrodes, and the two pairs of electrodes are orthogonally distributed and located in a cofferdam formed by downstream water. The receiver collects electric signals in the electrodes.

Compared with other methods, the novel tracing method based on an electromagnetic field provided in the present invention has the following innovative points and advantages:

1: The present invention provides the novel tracing detection apparatus, the apparatus is based on good electrical conductivity of water, and can adopt electromagnetic signals as a tracer to achieve rapid observation. Compared with traditional tracers, electromagnetic signals propagate fast in water, and are stable and free of pollution. Therefore, this apparatus can be applied to groundwater tracing detection, and the problems that the tracers in traditional tracing detection have poor timeliness and are not environmentally friendly are resolved.

2: In order to meet effective underground long-distance propagation of electromagnetic fields, design and selection of a transmitting antenna and transmitting signal frequencies are optimized. The antenna capable of transmitting a plurality of frequencies has a small size. When the antenna adopts a plurality of frequencies for receiving, a length of the antenna is about 10 meters to dozens of meters. The antenna can be selected according to detection parameters and detection requirements, and the antenna is easy to dispose and can be disposed in a limited space. Industrial electricity and plasma power can transmit electromagnetic signals with high power at a plurality of designed frequencies within a short period of time, thereby achieving rapid detection.

3: Based on the novel tracing detection apparatus, a qualitative and quantitative connectivity determination method is provided. Connectivity between two points can be rapidly determined, a distance of a water-bearing channel can be estimated according to a skin depth formula of electromagnetic fields, and a position, a runoff path, and a size of the water-bearing channel can be effectively deduced.

4: Waveforms and frequencies of a transmitting end and a receiving end can be flexibly selected to meet different detection requirements.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

FIG. 1 is a schematic structural diagram of the present invention.

In the drawings: Tx denotes an electromagnetic transmitting apparatus; Rx denotes an electromagnetic receiving apparatus; 1 denotes a transmitter; 2 denotes a generator; 3 denotes a transmitting antenna; 4 denotes a connection cable; 5 denotes a drill hole; 6 denotes a water-bearing channel; 7 denotes a receiver; 8 denotes a non-polarized electrode; and 9 denotes a magnetic rod.

DETAILED DESCRIPTION

It should be pointed out that the following detailed descriptions are all illustrative and are intended to provide further descriptions of the present invention. Unless otherwise specified, all technical and scientific terms used herein have the same meanings as those usually understood by a person of ordinary skill in the art to which the present invention belongs.

It should be noted that the terms used herein are merely used for describing specific implementations, and are not intended to limit exemplary implementations of the present invention. As used herein, the singular form is also intended to include the plural form unless the present invention clearly dictates otherwise. In addition, it should be further understood that, terms "comprise" and/or "include" used in this specification indicate that there are features, steps, operations, devices, components, and/or combinations thereof.

As described in the background art, traditional tracing detection has the following disadvantages: (1) Tracer-dependence, causing pollution or harmfulness. At present, commonly used tracers mainly include isotopes, common pigments, fluoresceins, radioactive indicators, and the like, and components of such substances easily cause damage to groundwater, soil and plants, pollute the environment and do not meet environmental requirements. In addition, the tracers have poor stability, detection results are greatly affected by human factors, and the tracers cannot adapt to complex geological environments, and cannot meet the requirements of large-scale connectivity detection. (2) Long observation time and poor timeliness.

The tracers move so slowly in water, particularly in a large-size water-bearing channel, that observation results can be obtained only one day or even several days after the tracers are put in the water, so that the size and development of the water-bearing channel cannot be learnt in time, and the timeliness is poor.

Embodiment 1

In an exemplary embodiment of the present invention, as shown in FIG. 1, the present invention adopts the following technical solution:
(1) An upstream point and a downstream point at which connectivity detection is to be performed are determined through geological investigation and the like. The points may be found by drilling, or be ascending springs or descending springs, karst collapse with flowing water, and the like. The upstream point is used as a transmitting end, which is equivalent to a tracer feeding end of traditional connectivity detection, and the downstream point is used as a receiving end, which is equivalent to a tracer receiving point of traditional connectivity detection.
(2) A transmitting antenna is disposed into water at the transmitting end of the upstream point, and a multi-frequency transmitting antenna is adopted. The antenna is generally a wire that is about 10 m long (a specific length is determined according to detection parameters). The multi-frequency transmitting antenna can be designed according to detection requirements, a transmitter, a generator, and the like are disposed at the transmitting end to form a closed electromagnetic transmitting system, and electromagnetic signals are transmitted into water.
(3) Two pairs of orthogonal non-polarized electrodes are disposed at the downstream point (generally an ascending spring), the downstream point is taken as a center, and downstream water is artificially guided to form a small cofferdam, so that the non-polarized electrodes remain in the water.
(4) The receiver is started first to collect electric signals in the non-polarized electrodes, and after a period of time (generally 10-30 minutes), the transmitting system is started without shutting down the receiver.
(5) After the transmitting system is started, transmission is performed according to designed waveforms for 10 and more times, and then the transmitting system is generally closed after working for about 30 minutes.
(6) After the transmitting system is completely closed, a collection system still works for about 10 minutes, and then detection is stopped.
(7) Whether a water leakage point is in connection with an aquifer at a drill hole is determined according to whether the electromagnetic signals can be monitored, and connectivity of an underground water-bearing channel is deduced according to frequencies, amplitudes, and phases of the electromagnetic signals, electrical conductivity of water, and an observation time length.

The following issues need to be considered during design of such a novel detection apparatus:
(1) Electromagnetic signals of conventional frequencies have short wavelengths, and karst water is a lossy dielectric, so that the electromagnetic signals have overlong propagation paths, and are susceptible to interference and have fast energy attenuation. In order to improve an electromagnetic signal level at the receiving end, the designed antenna needs to be disposed in the drill hole.
(2) How to reasonably select frequencies and waveforms of the transmitting end and the receiving end so as to ensure accuracy and high efficiency of tracing detection?
(3) How to qualitatively and quantitatively explain connectivity of the aquifer and a water bursting point?

To resolve the foregoing problems, the present invention provides the following design:

1: Design of the Transmitting Antenna

Transmitting frequencies of the transmitting antenna needs to meet the requirements of high anti-interference and low energy attenuation, and designed multi-frequency signals need to be adopted. According to the design of the transmitting antenna, a short antenna is needed under the premise of ensuring the designed multi-frequency signals, and the solution is as follows:
1) Very low frequency (VLF 3-30 kHz) electromagnetic fields have the advantages of low attenuation, high stability, long propagation distance, strong penetrability, and the like, and are widely applied to the military, civilian, and other fields. A size and frequencies of the transmitting antenna can meet the foregoing requirements. When the electromagnetic fields are propagated in water, the length of the antenna needs to be about 100 m under the condition that transmitting energy efficiency is considered. When an energy efficiency ratio is not considered, transmitting requirements can be met by using the antenna that is about 10 m long. That is, a transmitting frequency is low, an electromagnetic field propagation distance is long, and the size of the antenna is appropriate. A specific setting mode is as follows: The multi-frequency antenna is used as the transmitting antenna, different transmitting frequencies are designed according to electromagnetic exploration requirements, and the length of the transmitting antenna can be designed and selected according to field detection requirements. The designed multi-frequency transmitting antenna penetrates into a detected aquifer through the karst collapse or the drill hole, and the receiving apparatuses are disposed at a plurality of water leakage points, so that when the transmitting antenna transmits signals with the designed frequencies, the electromagnetic signals can be observed at one or several water bursting points within a short period of time, and connectivity of the water-bearing channel can be deduced by combining the frequencies, amplitudes, and phases of the electromagnetic signals, electrical conductivity of water, an observation time length, and skin depths.
2) The electromagnetic signals are transmitted by utilizing an industrial electricity source and a circuit apparatus of a capacitor. Switches are disposed on the capacitor to control charging and discharging processes of the capacitor, and a charging cable in connection with the industrial electricity source and a discharging cable connected to the transmitting antenna are disposed on a positive plate of the capacitor. A charging switch controls connection of a circuit between the charging cable and the capacitor, a discharging switch controls connection of a circuit between the discharging cable and the capacitor, and the transmitting antenna is a multi-frequency transmitting antenna. Before the circuit works, all the switches are turned off. During charging, the charging switch is turned on, the capacitor is charged by the charging cable connected to the industrial electricity source. An electric current flows into the positive plate of the capacitor, and when a voltage across the capacitor reaches a power supply voltage of the industrial electricity source, charging is completed, and then the charging switch is turned off. During discharging, the discharging switch is turned on, the discharging cable connected to the transmitting antenna is in connection with the capacitor and discharges, the electric current flows out of the positive plate of the capacitor, the electromagnetic fields with a plurality of frequencies are transmitted to the contacted underground aquifer through the transmitting antenna buried in a drill hole during discharging, and receiving apparatuses are disposed at the water leakage points for observation. Therefore, the electromagnetic signals can be observed at one or more water leakage points within a short period of time, and the connectivity of the water-bearing channel can be deduced by combining frequencies, amplitudes, and phases of the electromagnetic signals, electrical conductivity of water, the observation time length, and the skin depths.

3) High-voltage discharge is achieved through manual lightning triggering or plasma discharging. The electromagnetic fields with a plurality of frequencies are transmitted to the underground aquifer through the transmitting antenna at the transmitting end through plasma power generation, the receiving apparatuses are disposed at the water leakage points, the frequencies, amplitudes, and phases of the electromagnetic signals at the water leakage points are observed, and the connectivity of the water-bearing channel can be deduced by combining the frequencies, amplitudes, and phases of the electromagnetic signals, electrical conductivity of water, the observation time length, and the skin depths.

2: Design of the Receiving Apparatus

A shallow water tank is disposed at the water leakage point, and water at the water leakage point is led out to facilitate observation. A pair of electrodes AB and electrodes NB' orthogonal to the electrodes AB are connected to two ends of the shallow water tank for observing the electromagnetic signals, and a magnetic rod can be disposed above the water leakage point to collect three-component signals of the magnetic fields. The electrodes are preferably non-polarized electrodes that have stable electrochemical performance and small range changes.

3: Qualitative and Quantitative Interpretation of Connectivity of the Water-Bearing Channel.

1) Qualitative interpretation: used for determining whether the water leakage point is in connection with the aquifer, and preliminarily learning a path and a flow direction of the underground water-bearing channel.

Method 1: First, the transmitting antenna is disposed at the upstream point, the receiving apparatus is disposed at the downstream point, the electromagnetic fields with a plurality of frequencies are transmitted at the transmitting end, and electromagnetic signal observation is conducted at the receiving end. If obvious electromagnetic signals are observed at the specific water leakage point, it indicates that the water leakage point is in connection with the aquifer; otherwise, the water leakage point and the aquifer are not connected.

Method 2: Due to uncertainty of a surrounding stratum structure of the underground water-bearing channel, and excessive abnormal interference, observing the electromagnetic signals by the receiving apparatus is affected. In order to ensure that the electromagnetic signals observed by the receiving apparatus is the multi-frequency signals from the transmitting antenna at the drill hole, the multi-frequency signals with specific frequencies can be transmitted. Such designed multi-frequency signals have high anti-interference, so that whether the signals are similar to the signals of the transmitting end is determined according to the amplitudes, phases, and other features of the signals during observation at the receiving end. If the signals are similar, it is determined that the water leakage point and the aquifer are connected; otherwise, the water leakage point and the aquifer are not connected.

2) Quantitative interpretation: used for roughly determining connectivity of the water-bearing channel, and further deducing the path length of the water-bearing channel.

Method 1: The path length is determined based on a skin depth. Groundwater is a good conductor, and when an electromagnetic field is propagated in this medium, the phase changes along with the distance based on a propagation constant, and the amplitude is exponentially attenuated along with the distance. When an amplitude of the electromagnetic field is reduced to the original $e^{-1} \approx 0.37$, a propagation thickness is a penetration capacity of the electromagnetic field in such a medium, which is called a skin depth. The path length of the water-bearing channel detected at this observation frequency can be roughly estimated according to a transmitting frequency, an electrical conductivity of the karst water, and the following skin depth formula (1):

$$\delta = \sqrt{\frac{2}{\sigma \omega \mu}} \approx 503 \sqrt{\frac{1}{\sigma f}}; \quad (1)$$

delta represents the skin depth (m); $\sigma$ represents electrical conductivity of a medium (S/m); $\omega$ represents an angular frequency (rad/s); and f represents a frequency (Hz).

The skin depths of the multi-frequency electromagnetic fields in water in different designs can be preliminarily estimated according to the formula, so as to roughly infer the longest water-bearing channel distance detectable by tracing detection. It is supposed that electrical conductivity of the karst water can be obtained through actual measurement, as shown in Table 1. The designed multi-frequency antennas with different frequencies can be selected for tracing detection according to Table 1 in combination with the electrical conductivity of the karst water and actual onsite situations.

TABLE 1

Skin depths of electromagnetic fields with different frequencies in karst water

| Frequency (Hz) | Electrical Conductivity (S/m) | Electrical Resistivity (omega*m) | Skin Depth (m) |
|---|---|---|---|
| 5 | 0.010 | 100 | 2249.48 |
|  | 0.013 | 75 | 1972.93 |
|  | 0.020 | 50 | 1590.63 |
|  | 0.100 | 10 | 711.35 |
|  | 0.200 | 5 | 503.00 |
|  | 0.33 | 3 | 391.58 |
| 10 | 0.010 | 100 | 1590.63 |
|  | 0.013 | 75 | 1395.07 |
|  | 0.020 | 50 | 1124.74 |
|  | 0.100 | 10 | 503.00 |
|  | 0.200 | 5 | 355.67 |
|  | 0.33 | 3 | 276.89 |
| 30 | 0.010 | 100 | 918.35 |
|  | 0.013 | 75 | 805.44 |
|  | 0.020 | 50 | 649.37 |
|  | 0.100 | 10 | 290.41 |
|  | 0.200 | 5 | 205.35 |
|  | 0.330 | 3 | 159.86 |

Method 2: The path length is determined through amplitude attenuation degrees of the electromagnetic signals. The electromagnetic signals with a fixed frequency are transmitted at the transmitting end, an amplitude $A_1$ and a phase $\varphi_1$ of the electromagnetic signals are recorded, an amplitude $A_2$ and a phase $\varphi_2$ of the electromagnetic signals are recorded after the receiving end receives the electromagnetic signals, and a ratio of the amplitudes of the transmitted signals to those of the received signals is calculated according to the following formula:

$$k = \frac{A_2}{A_1} \times 100\%;$$

k represents an amplitude attenuation ratio; $A_1$ represents a signal amplitude at the transmitting end; and $A_2$ represents a signal amplitude at the receiving end.

A path length or connectivity of the water-bearing channel between the transmitting end and the receiving end is determined according to a value of k (x % is used as a critical point). k≥x % indicates that the connectivity is good and the path is short. k<x % indicates that the connectivity is poor and the path is long. Such a method can only estimate the connectivity of the water-bearing channel, but cannot actually determine the path length of the water-bearing channel.

Method 3: A length of the connection path is determined with reference to a formula of calculating signal power in a free space. A free space propagation model is as follows:

$$P_r(d) = \frac{P_t G_t G_r \lambda^2}{(4\pi)^2 d^2 L};$$

$P_r(d)$ represents a received signal power; $P_t$ represents a transmitting power; $G_t$ represents a transmitting antenna gain; $G_r$ represents a receiving antenna gain; $\lambda$ represents a wavelength (m); d represents a distance (m) between the transmitting end and the receiving end;

L represents a loss irrelevant to propagation (transmission line attenuation, filtering loss, antenna loss), ideally L=0.

Because water is a lossy dielectric, corresponding coefficients in the formula need to be adjusted when the signals are propagated in the water-bearing channel, the connectivity of the water-bearing channel can be determined according to a signal power ratio of the transmitting end to the receiving end, and the path length of the water-bearing channel can be estimated according to d.

The application range of the novel tracing detection apparatus is as follows: 1: connectivity detection of the groundwater system in hydrogeological surveys; 2: leakage or piping detection of dams and the like; and 3: detection of karst channels under complex geological conditions in underground construction.

Embodiment 2

As shown in FIG. 1, the present embodiment provides a tracing detection apparatus, including an electromagnetic transmitting apparatus Tx and an electromagnetic receiving apparatus Rx. A tree channel between the electromagnetic transmitting apparatus Tx and the electromagnetic receiving apparatus Rx is a water-bearing channel 6 to be detected, through which electrical signals propagate.

The electromagnetic transmitting apparatus Tx is disposed at an upstream point and includes a transmitter 1, a generator 2, a transmitting antenna 3, and a connection cable 4. The transmitter 1 includes a capacitor, switches are disposed on the capacitor to control charging and discharging processes of the capacitor, and a charging cable in connection with an industrial electricity source and a discharging cable connected to the transmitting antenna 3 are disposed on a positive plate of the capacitor. The charging switch controls connection of a circuit between the charging cable and the capacitor, and the discharging switch controls connection of a circuit between the discharging cable and the capacitor.

The transmitting antenna 3 is a multi-frequency transmitting antenna with a plurality of frequencies, the transmitting antenna penetrates into a detected aquifer through karst collapse or a drill hole, and a length and frequencies of the antenna can be designed and selected according to actual detection requirements and detection parameters. The transmitting antenna 3 is connected to the transmitter through the connection cable 4 and is disposed in the drill hole 5.

The electromagnetic receiving apparatus Rx is disposed at a downstream point and includes non-polarized electrodes 8, a receiver 7, and a magnetic rod 9. The non-polarized electrodes 8 includes two pairs of electrodes AB and A'B'. AB and A'B' are two pairs of orthogonal non-polarized electrodes and are used for receiving electromagnetic signals, and a magnetic probe is used for receiving magnetic field signals. The non-polarized electrodes are disposed at an edge of a cofferdam, the magnetic rod 9 is disposed right above a water exit, and the non-polarized electrodes and the magnetic rod are connected to the receiver through cables. The receiver 7 is configured to collect electric signals in the electrodes.

The electrodes are non-polarized electrodes, a shallow water tank is disposed at a water leakage point, and therefore water at the water leakage point is led out to facilitate observation. The pair of electrodes AB and the electrodes A'B' orthogonal to the electrodes AB are connected to each end of the shallow water tank for observing electromagnetic signals, and the magnetic rod can be disposed above the water leakage point to collect three-component signals of the magnetic fields. The electrodes are preferably non-polarized electrodes, which have stable electrochemical performance and small range changes.

The novel tracing detection apparatus provided by the present invention is based on the good electrical conductivity of water, and can use the electromagnetic signals as the tracer to achieve rapid observation. Compared with traditional tracers, the electromagnetic signals propagate fast in water, and are stable in property and free of pollution. Therefore, this apparatus can be applied to groundwater tracing detection, and the problems that the tracers have poor timeliness and are not environmentally friendly are resolved.

In order to meet the requirement of effective underground long-distance propagation of the electromagnetic fields, design and selection of a transmitting antenna and the transmitting signal frequencies are optimized. Compared with traditionally designed multi-frequency antenna, the multi-frequency antenna designed by the present invention has a small size, easy to dispose and can be disposed in a limited space. Industrial electricity and plasma power generation can transmit the electromagnetic signals with high power and a plurality of designed frequencies within a short period of time, thereby achieving rapid detection.

The foregoing descriptions are merely preferred embodiments of the present invention and are not intended to limit the present invention. Those skilled in the art may make various modifications and changes to the present invention. Any modification, equivalent replacement, or improvement made within the spirit and principle of the present invention shall fall within the protection scope of the present invention.

What is claimed is:

1. A novel tracing apparatus based on an electromagnetic field, comprising an electromagnetic transmitting system, a transmitting antenna, electrodes, and a receiver, wherein:

the electromagnetic transmitting system is disposed at an upstream point to be detected being as a transmitting end, and is configured to transmit electromagnetic signals to water by using an industrial electricity source and a circuit apparatus of a capacitor; the electromagnetic transmitting system comprising a transmitter and a generator, wherein the transmitter comprises the capacitor; switches are disposed on the capacitor to control charging and discharging processes of the capacitor, and a charging cable in connection with the industrial electricity source and a discharging cable connected to the transmitting antenna are disposed on a positive plate of the capacitor, wherein a charging switch controls connection of a circuit between the charging cable and the capacitor, and a discharging switch controls connection of a circuit between the discharging cable and the capacitor;

the transmitting antenna is a multi-frequency transmitting antenna with a plurality of frequencies, and is disposed into the at the transmitting end of the upstream point and penetrates into a detected aquifer through karst collapse or a drill hole, and a length and the frequencies of the transmitting antenna can be designed and selected according to actual detection parameters and detection requirements, wherein types of transmitting frequencies of the transmitting antenna meet the detection requirements; and the electrodes and the receiver are disposed at a downstream point to be detected, wherein the electrodes comprise two pairs of electrodes, and the two pairs of electrodes are orthogonally distributed and located in a cofferdam formed by downstream water_guided along with the downstream point to be detected as a center; and the receiver collects electric signals in the electrodes; wherein, the electrodes and the receiver are provided with a plurality of groups according a number of a plurality of water leakage points of the downstream point to be detected;

wherein, after determining the upstream point to be detected and the downstream point to be detected, disposing the novel tracing apparatus;

starting the receiver to collect electric signals in the non-polarized electrodes, and after a period of time, starting a transmitting system without shutting down the receiver;

after the transmitting system is started, completing a plurality of times of transmitting according to designed waveforms, and after the transmitting system works for a set period of time, closing the transmitting system; and after the transmitting system is completely closed, enabling a collection system to continue working for a set period of time, and then stopping detection; determining whether a water leakage point is in connection with an aquifer at a drill hole according to whether the electromagnetic signals can be monitored, and deducing connectivity of an underground water-bearing channel according to frequencies, amplitudes, and phases of the electromagnetic signals, electrical conductivity of water, and an observation time length;

wherein, before the circuit apparatus works, all the switches are turned off; during charging, the charging switch is turned on, the capacitor is charged by the charging cable connected to the industrial electricity source, an electric current flows into the positive plate of the capacitor, when a voltage across the capacitor reaches a power supply voltage of the industrial electricity source, charging is completed, and then the charging switch is turned off;

during discharging, the discharging switch is turned on, the discharging cable connected to the transmitting antenna is in connection with the capacitor and discharges, the electric current flows out of the positive plate of the capacitor, and designed electromagnetic fields with a plurality of frequencies are transmitted to the contacted underground aquifer through the transmitting antenna buried in the drill hole during the discharging.

2. The novel tracing apparatus based on the electromagnetic field according to claim 1, wherein the electrodes are non-polarized electrodes.

3. The novel tracing apparatus based on the electromagnetic field according to claim 1, wherein designed electromagnetic fields with a plurality of frequencies are transmitted to the underground aquifer through the transmitting antenna at the transmitting end in a manner of plasma power generation or manual lightning triggering.

4. The novel tracing apparatus based on the electromagnetic field according to claim 1, wherein a path length of the water-bearing channel is determined based on a skin depth according to the following formula:

$$\delta = \sqrt{\frac{2}{\sigma\omega\mu}} \approx 503\sqrt{\frac{1}{\sigma f}} \delta = \sqrt{\frac{2}{\sigma\omega\mu}} \approx 503\sqrt{\frac{1}{\sigma f}},$$

$\delta$ represents the skin depth; $\sigma$ represents electrical conductivity of a medium; $\omega$ represents an angular frequency; and f represents a frequency.

5. The novel tracing apparatus based on the electromagnetic field according to claim 1, wherein determining a path length of the water-bearing channel based on amplitude attenuation degrees of the electromagnetic signals, comprising:

transmitting the electromagnetic signals with a fixed frequency at the transmitting end, recoding an amplitude $A_1$ and a phase $\varphi_1$ of the electromagnetic signals of the transmitted electromagnetic signals; receiving, by the receiving end, the transmitted electromagnetic signals, and recording an amplitude $A_2$ and a phase $\varphi_2$ of the received electromagnetic signals, and calculating a ratio of amplitudes of the transmitted electromagnetic signals to those of the received electromagnetic signals according to the following formula:

$$k = \frac{A_2}{A_1} \times 100\%,$$

wherein, k represents an amplitude attenuation ratio; $A_1$ represents a signal amplitude of the transmitting end; $A_2$ represents a signal amplitude of the receiving end; the path length or connectivity of the water-bearing channel between the transmitting end and the receiving end is determined according to a value of the k, wherein, when k≥x %, indicating the connectivity is good and the path is shorter; when k<x %, indicating the connectivity is poor and the path is longer; wherein x % is used as a critical point.

6. The novel tracing apparatus based on the electromagnetic field according to claim 1, wherein calculating a path length of the water-bearing channel with reference to a signal power calculation formula in a free space, and a free space propagation model is as follows:

$$P_r(d) = \frac{P_t G_t G_r \lambda^2}{(4\pi)^2 d^2 L},$$

wherein, $P_r(d)$ represents a received signal power; $P_t$ represents a transmitting power; $G_t$ represents a transmitting antenna gain; $G_r$ represents a receiving antenna gain; $\lambda$ represents a wavelength; d represents a distance (meter) between the transmitting end and the receiving end;

L represents a loss irrelevant to propagation, ideally L=0; because water is a lossy dielectric, corresponding coefficients in the formula need to be adjusted when the signals are propagated in the water-bearing channel, the connectivity of the water-bearing channel can be determined according to a signal power ratio of the transmitting end to the receiving end, and the path length of the water-bearing channel can be estimated according to d.

* * * * *